(12) United States Patent
Shauh et al.

(10) Patent No.: US 9,055,136 B2
(45) Date of Patent: Jun. 9, 2015

(54) CONTROLLING STREAMING DELAY IN NETWORKS

(71) Applicant: QUALCOMM Incorporated, San Diego, CA (US)

(72) Inventors: Jack S. Shauh, San Diego, CA (US); Kuo-Chun Lee, San Diego, CA (US); Rajesh Narayanan, San Diego, CA (US); Giridhar Kapalli, San Diego, CA (US); Stephen M. Verrall, San Diego, CA (US); Shailesh Maheshwari, San Diego, CA (US); Thadi M. Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 13/650,074

(22) Filed: Oct. 11, 2012

(65) Prior Publication Data
US 2013/0097287 A1    Apr. 18, 2013

Related U.S. Application Data
(60) Provisional application No. 61/546,964, filed on Oct. 13, 2011.

(51) Int. Cl.
*H04L 29/06*    (2006.01)

(52) U.S. Cl.
CPC .......... *H04L 65/605* (2013.01); *H04L 65/4076* (2013.01); *H04L 65/607* (2013.01)

(58) Field of Classification Search
USPC ......... 709/236, 231, 232, 203, 217, 219, 223, 709/224
See application file for complete search history.

(56) References Cited

U.S. PATENT DOCUMENTS

| 7,532,629 B2 | 5/2009 | Ebata |
| 7,609,716 B2 | 10/2009 | Brown et al. |

(Continued)

FOREIGN PATENT DOCUMENTS

| WO | 2007026237 A1 | 3/2007 |

OTHER PUBLICATIONS

"3rd Generation Partnership Project; Technical Specification Group Services and System Aspects Transparent end-to-end Packet-switched Streaming Service (PSS); Progressive Download and Dynamic Adaptive Streaming over HTTP (3GP-DASH) (Release 10)", 3GPP Standard; 3GPP TS 26.247, 3rd Generation Partnership Project (3GPP) Mobile Competence Centre ; 650. Route Des Lucioles; F-06921 Sophia-Antipolis Cedex; France, No. V1.0.0, Sep. 22, 2010, pp. 1-35, XP050442136.

(Continued)

*Primary Examiner* — Lashonda Jacobs
(74) *Attorney, Agent, or Firm* — Novak Druce Connolly Bove + Quigg LLP

(57) ABSTRACT

Techniques are provided for reducing delay during streaming transmissions. For example, a method may include receiving a stream of data segments. The method may include establishing a first group of segments based on the data segments, and generating a first table of information. The method may include transmitting the first table and the first group of segments, and establishing a second group of segments based on the data segments, the second group of segments including a partial overlap of data segments included in the first group of segments. The method may include generating a second table of information, and transmitting the second table and a collection of segments that includes data segments from the second group that were not part of the first group.

35 Claims, 12 Drawing Sheets

(56) References Cited

U.S. PATENT DOCUMENTS

| | | | |
|---|---|---|---|
| 8,793,743 B2* | 7/2014 | Oyman | 725/62 |
| 2009/0077247 A1* | 3/2009 | Bouazizi et al. | 709/229 |
| 2009/0177942 A1* | 7/2009 | Hannuksela et al. | 714/752 |
| 2011/0060798 A1 | 3/2011 | Cho et al. | |
| 2011/0286546 A1* | 11/2011 | Song et al. | 375/295 |
| 2012/0166667 A1 | 6/2012 | Hall | |
| 2012/0174163 A1 | 7/2012 | Moorthy et al. | |
| 2012/0192230 A1* | 7/2012 | Algie et al. | 725/38 |
| 2012/0239785 A1* | 9/2012 | Pazos | 709/219 |
| 2012/0259994 A1* | 10/2012 | Gillies et al. | 709/231 |
| 2013/0007814 A1* | 1/2013 | Cherian et al. | 725/62 |
| 2013/0036234 A1* | 2/2013 | Pazos et al. | 709/231 |
| 2013/0103849 A1* | 4/2013 | Mao et al. | 709/231 |
| 2013/0254611 A1* | 9/2013 | Amerga et al. | 714/746 |
| 2013/0290493 A1* | 10/2013 | Oyman et al. | 709/219 |
| 2014/0095668 A1* | 4/2014 | Oyman | 709/219 |
| 2014/0098745 A1* | 4/2014 | Balasubramanian et al. | 370/328 |
| 2014/0189772 A1* | 7/2014 | Yamagishi et al. | 725/116 |

OTHER PUBLICATIONS

International Search Report and Written Opinion—PCT/US2012/059995—ISA/EPO—Feb. 5, 2013 (112763W0).

Paila et al., "Flute—File Delivery over Unidirectional Transport", Network Working Group, RFC 3926, Oct. 1, 2004, The Internet Society, XP015009699, ISSN: 0000-0003.

* cited by examiner

CONTROLLING STREAMING DELAY IN NETWORKS

CROSS-REFERENCE TO RELATED APPLICATION

The present Application for Patent claims priority to Provisional Application No. 61/546,964, filed Oct. 13, 2011, entitled "CONTROLLING STREAMING DELAY IN NETWORKS", which is assigned to the assignee hereof, and is hereby expressly incorporated in its entirety by reference herein.

BACKGROUND

1. Field

Aspects of the present disclosure may relate to reducing delay when transmitting information. More specifically, aspects of the present invention may relate to reducing the delay in the end-to-end content (such as video) transmission that is attributable to a File Delivery over Unidirectional Transport (FLUTE) package engine in a Dynamic Adaptive Streaming over HTTP (DASH) over FLUTE environment.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

In broadcast operation, several eNBs in a broadcast area may broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. As the demand and system capability for event-related multimedia and other broadcast services has increased, system operators have shown increasing interest in making use of broadcast operation in 3GPP networks. In the past, 3GPP LTE technology has been primarily used for unicast service, leaving opportunities for improvements and enhancements related to broadcast signaling.

Transmission of content, such as video content, may be performed by various methods in communication networks. In the case of video content, for example, transmission of video information from a video source to display can be made via, inter alia, unicast transmissions and multicast/broadcast transmissions. Unicast transmissions are directed to a specifically targeted receiving device. To obtain a unicast transmission, a target device may have a Uniform Resource Locator ("URL") with the address of the video source, and may generate an HTTP GET command that it may send to the video source (typically a server) to facilitate download of the video file.

A known method for transmission of video in a unicast environment is through Dynamic Adaptive Streaming over HTTP (DASH). Use of DASH in unicast obtains the entire file. DASH may convert the video file into smaller components called DASH segments, which may be reassembled at the receiving device to display the desired video.

Multicast or broadcast transmissions, such as in evolved-Multimedia Broadcast/Multicast Service (eMBMS), present different considerations, as the transmissions are sent to multiple receiving devices. In these environments the modems of the receiving devices can obtain information before the associated system actually takes steps to obtain that information. That received information may be stored locally in the receiving device's local cache. When the system (typically at the application layer) generates a URL to obtain the information, the generated URL may point toward the local cache rather than the server as in the unicast environment.

DASH utilized in combination with File Delivery over Unidirectional Transport (FLUTE) is one methodology that has been used for multicast environments. In this methodology, video content may be converted into DASH segments. Small groups of DASH segments may be accumulated by a FLUTE package engine (FPE), which in turn may convert the DASH segments into FLUTE packets for transmission. Use of DASH over FLUTE in this environment may lead to delay issues and interruptions in display of video content.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed is an apparatus and method for controlling streaming delay in unicast and multicast/broadcast transmissions. According to one aspect, a method for sending data segments includes receiving a stream of data segments; establishing a first group of segments based on the data segments; generating a first table of information, the information including one or more attributes for respective segments in the first group of segments; transmitting the first table and the first group of segments; establishing a second group of segments based on the data segments, the second group of segments including a partial overlap of data segments included in the first group of segments; generating a second table of information, the information including one or more attributes for respective segments in the first and second groups of segments; and transmitting the second table and a collection of segments that includes data segments from the second group that were not part of the first group.

According to another aspect, a method for sending data segments includes receiving a stream of data segments; grouping individual segments of the stream into groups of segments of size NS, the groups of segments including a first group, a last group, and one or more intermediate groups between the first and the last group of segments; generating, for a first intermediate group of the one or more intermediate groups, a table of information including one or more attributes for respective segments in the first intermediate group and an immediately preceding group in the stream; and transmitting the table and a collection of segments that includes data segments from the first intermediate group that were not part of the immediately preceding group.

According to another aspect, a system for sending data segments includes means for establishing a first group of segments based on a received stream of data segments; means for generating a first table of information, the information including one or more attributes for respective segments in the first group of segments; means for transmitting the first table and the first group of segments; means for establishing a second group of segments based on the data segments, the second group of segments including a partial overlap of data segments included in the first group of segments; means for generating a second table of information, the information including one or more attributes for respective segments in the first and second groups of segments; and means for transmitting the second table and a collection of segments that includes data segments from the second group that were not part of the first group.

According to another aspect, a system for sending data segments includes means for grouping individual segments, based on a received stream of data segments, into groups of segments of size NS, the groups of segments including a first group, a last group, and intermediate groups between the first and the last group of segments; means for generating, for a first intermediate group, a table of information including one or more attributes for respective segments in the first intermediate group and an immediately preceding group in the stream; and means for transmitting the table and a collection of segments that includes data segments from the first intermediate group that were not part of the immediately preceding group.

According to another aspect, a system for sending data segments includes at least one processor configured to receive a stream of data segments, to establish a first group of segments based on the data segments, to generate a first table of information, the information including one or more attributes for respective segments in the first group of segments, to transmit the first table and the first group of segments, to establish a second group of segments based on the data segments, the second group of segments including a partial overlap of data segments included in the first group of segments, to generate a second table of information, the information including one or more attributes for respective segments in the first and second groups of segments, and to transmit the second table and a collection of segments that includes data segments from the second group that were not part of the first group; and a memory coupled to the at least one processor for storing data.

According to another aspect, a system for sending data segments includes at least one processor configured to receive a stream of data segments, to group individual segments of the stream into groups of segments of size NS, the groups of segments including a first group, a last group, and intermediate groups between the first and the last group of segments, to generate, for a first intermediate group, a table of information including one or more attributes for respective segments in the first intermediate group and an immediately preceding group in the stream, to transmit the table and a collection of segments that includes data segments from the first intermediate group that were not part of the immediately preceding group; and a memory coupled to the at least one processor for storing data.

According to another aspect, a computer program product for managing the transmission of data segments includes a computer-readable medium comprising code for receiving a stream of data segments, for establishing a first group of segments based on the data segments, generating a first table of information, the information including one or more attributes for respective segments in the first group of segments, for transmitting the first table and the first group of segments, for establishing a second group of segments based on the data segments, the second group of segments including a partial overlap of data segments included in the first group of segments, for generating a second table of information, the information including one or more attributes for respective segments in the first and second groups of segments, and for transmitting the second table and a collection of segments that includes data segments from the second group that were not part of the first group.

According to another aspect, a computer program product for managing the transmission of data segments includes a computer-readable medium including code for receiving a stream of data segments. The computer-readable medium may further include code for grouping individual segments of the stream into groups of segments of size NS, the groups of segments including a first group, a last group, and intermediate groups between the first and the last group of segments. The computer-readable medium may further include code for generating, for a first intermediate group, a table of information including one or more attributes for respective segments in the first intermediate group and an immediately preceding group in the stream. The computer-readable medium may further include code for transmitting the table and a collection of segments that includes data segments from the first intermediate group that were not part of the immediately preceding group.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

In the discussion below, transmission of video content is specifically discussed. However, it should be understood that video is only an example to which the inventive concepts are not necessarily limited, and these concepts may be applicable to other types of content.

Figure 1:
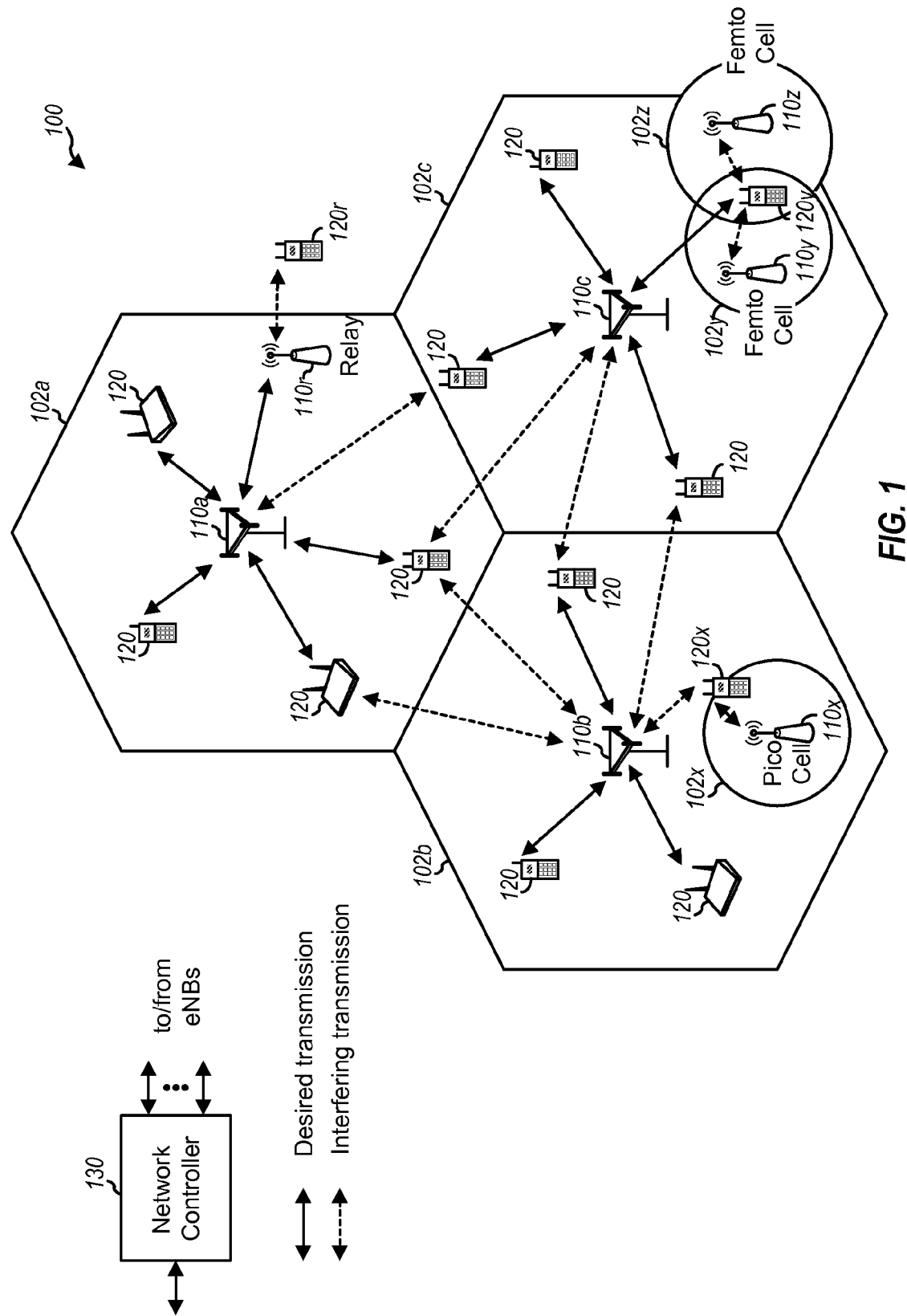
FIG. 1 is an example of a network in which embodiments of the invention may be used according to an aspect of the present disclosure.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
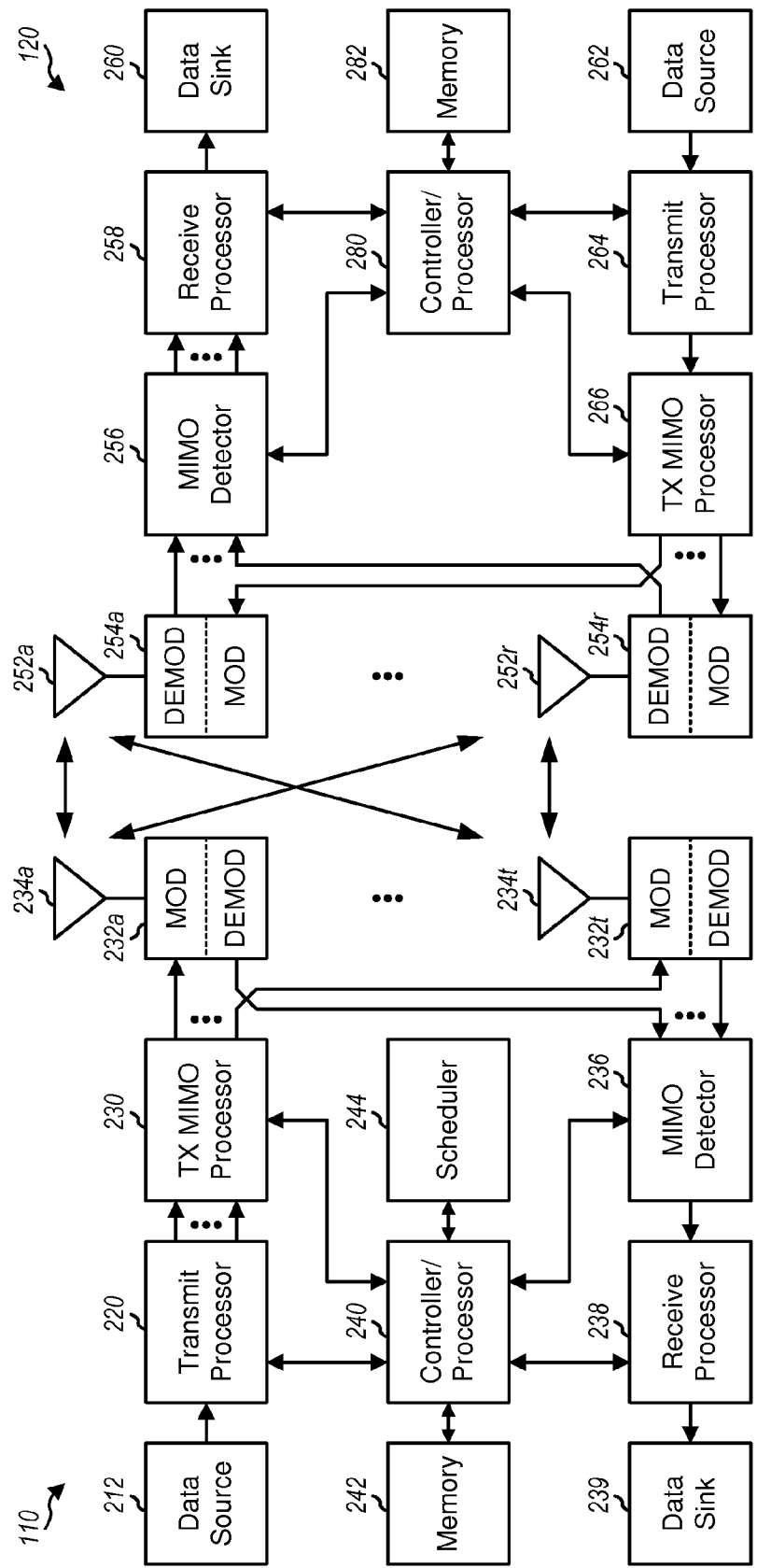
FIG. 2 is a block diagram conceptually illustrating a design of a base station/eNB and a UE configured according to one aspect of the present disclosure.

FIG. 2 shows a block diagram of an example of a design of a base station/eNB 110 and a UE 120, which may correspond to one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the PBCH, PCFICH, PHICH, PDCCH, etc. The data may be for the PDSCH, etc. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 110. At the base station 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct the execution of various processes for the techniques described herein. The processor 280 and/or other processors and modules at the UE 120 may also perform or direct the execution of the functional blocks, and/or other processes for the techniques described herein. The memories 242 and 282 may store data and program codes for the base station 110 and the UE 120, respectively. A scheduler 244 may schedule UEs for data transmission on the downlink and/or uplink.

In one configuration, the UE 120 for wireless communication may include means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 280, the memory 282, the receive processor 258, the MIMO detector 256, the demodulators 254a, and the antennas 252a configured to perform the functions recited by the aforementioned means. In another aspect, the aforementioned means may be a module or any apparatus configured to perform the functions recited by the aforementioned means.

Figure 3:
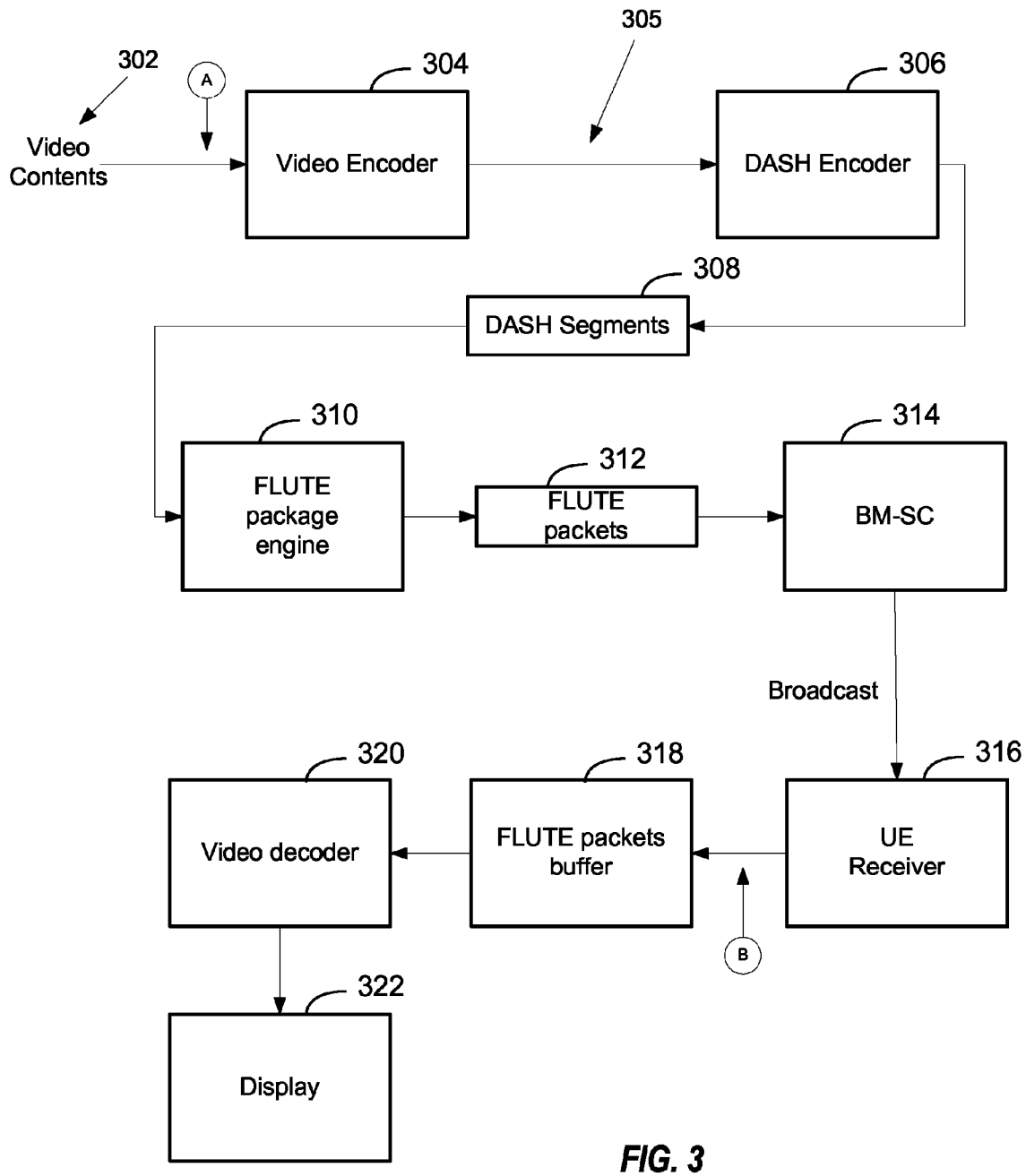
FIG. 3 is a block diagram conceptually illustrating an exemplary embodiment of DASH over FLUTE in eMBMS.

A property of DASH is that each DASH segment can be accessed through an identifier, e.g., a uniform resource locator (URL) (in the discussion below, "URL" will be used, but it should be understood that the invention is not necessarily limited thereto). Referring now to FIG. 3, an exemplary architecture for sending video content 302 to a display 322 through DASH over FLUTE in eMBMS is shown. A video encoder 304 (e.g., MPEG 2, MPEG4, H.264, H.265 codecs for video) may receive the video content 302 and may output encoded video content 305. The encoded video content may have a fixed time duration. A DASH encoder 306 may receive the encoded video content 305 and may output DASH video segments 308 formatted for DASH, e.g., 3GPP Adaptive HTTP Streaming (may also be referred to as 3GP-DASH).

The encoding provided by video encoder 304 and DASH encoder 306 may take approximately t seconds, where t is the duration of the corresponding (portion of) underlying video content encoded by the video encoder 304 and DASH encoder 306. Thus, by way of non-limiting example, for two seconds of video content 302, it may take approximately two seconds to output DASH segment(s) 308 that corresponds to the two seconds of video content. The bulk of the encoding time may generally be taken up by video encoder 304.

FLUTE package engine (FPE) 310 may receive the DASH segments 308 and may convert them into FLUTE packets 312. A Broadcast-Multicast Service Center ("BM-SC") 314 may receive the FLUTE packets 312 and may broadcast them to a UE receiver 316. The received FLUTE packets 312 may be received at a buffer 318, decoded at a decoder 320, and displayed on a display 322. UE receiver 316, buffer 318, decoder 320, and/or display 322 may be part of a UE 120 discussed with respect to FIGS. 1 and 2.

In order to correlate FLUTE packets 312 with DASH segments 308, the FPE 310 may assign one Transmission Object Identifier (TOI) for each segment; one segment may be considered as one file, and the segment URL can be the same as the file name of a FLUTE file identified by the TOI. When the FPE 310 aggregates multiple DASH segments 308, it may generate a File Delivery Table (FDT) instance to describe attributes for those DASH segments 308. An exemplary FDT instance is described below with respect to FIG. 6B. Attributes may include a file name (specified by, e.g., a URL), file type (e.g., MIME media type of the file), size of the file, encoding format of the file, and/or the message digest of the file. The FDT may be part of the FLUTE packets 312 sent by the FPE 310.

An issue with the above methodology is that DASH formatting and FLUTE packaging is sequential, such that the delay may be proportional to the number of DASH segments 308 that the FPE 310 has to receive prior to generating an FDT instance. In addition, the delay may be proportional to a time duration t of the DASH segments 308. In a live streaming broadcast system, the end-to-end delay may generally need to be maintained within a predetermined time limit, which may be determined by system requirements and/or end user experience, for example, at a mobile device. The end-to-end delay may be thought of as the time delay between video content fed into a video encoder at the network side (e.g., Point A in FIG. 3) and the display of content at the UE receiver side (e.g., Point B in FIG. 3). That delay may depend on three (3) parameters: the number NS of DASH segments 308 that the FPE 310 may aggregate, the time duration t of those DASH segments 308, and the Multicast channel ("MCH") Scheduling Period (MSP). The MSP may be given by the BM-SC through the MBSFNAreaConfiguration RRC message over Multicast control channel (MCCH).

For example, in a first example configuration, the FPE 310 is configured to aggregate five (5) DASH segments with each DASH segment having a two (2) second time duration. In a second example configuration, the FPE 310 is configured to aggregate three (3) DASH segments with each DASH segment having a two (2) second time duration. In a third example configuration, the FPE 310 is configured to aggregate five (5) DASH segments with each DASH segment having a one (1) second time duration. In the first example, the end-to-end delay is proportional to ten (10) seconds because there are five (5) DASH segments with each segment being two (2) seconds in duration. In the second example, the end-to-end delay is proportional to six (6) seconds, and in the third example, the end-to-end delay is proportional to five (5) seconds. The three example configurations show that the end-to-end delay may be reduce by one or both of reducing the number of DASH segments aggregated by the FPE 310 and reducing the time duration of each DASH segment. Based on a time requirement or constraint, the number of DASH segments to aggregate per group or the time duration for a DASH segment may be determined to be within the time requirement (i.e., less than or equal to a time delay limit) For example, for a time requirement of ten (10) seconds end-to-end delay, one example configuration includes aggregating four (4) DASH segments per group with a two (2) second time duration per DASH segment, yielding an eight (8) second end-to-end delay. The time requirement may relate to an initial delay (or startup delay) which is the time delay between a program start time and the time the user sees the content on a display. For example, when a user first tunes to a channel at the program start time, the user waits for the content based on the delay of a first group of segments. Moreover, a second time requirement may relate to a channel switching delay (e.g., the time delay the user experiences when switching from one channel to another). The channel switching delay may be proportional to the SGO and time duration per DASH segment. For example, a user may experience a channel switching delay when tuning to a channel that is already streaming content. For example, the user may tune to the channel after two groups of DASH segment have been transmitted. The maximum channel switching delay experienced by the user may be proportional to the number of DASH segments determined by the SGO and the time duration per DASH segment. On average, the channel switching delay is one half of the maximum channel switching delay because the user may tune in at any time during the transmission period of a DASH segment group. In related aspects, delays associated with scheduling the aggregated DASH segments in the MSP may increase the end-to-end delay.

In a broadcast/multicast environment, all users that tune to the same channel receive the same content. Different users may tune to the channel at different times. The initial delay of a user tuning into a channel in an environment of, e.g., FIG. 3 may be in the range of 0 to NS*t+MSP; the average delay may be (NS*t+MSP)/2. In a worst-case scenario, if the FDT instance corresponding to one or more DASH segment(s) 308 misses the current MSP transmission window by a narrow margin, corresponding FLUTE packets 312 may have to wait for the next MSP window to be transmitted. This may result in an interruption of video playback at the user's display 322.

The delay induced by the FPE 310 can be reduced by reducing the number of DASH segments 308 that the FPE 310 may aggregate, in theory down to one (1) segment. However, the creation and transmission of the corresponding FDT instance itself presents overhead to the system that may offset the benefits that would be gained. Similarly, a smaller value of duration t can shorten the delay, but this may decrease the encoding efficiency. For live or streaming video, this can present difficulties because the information is sent in small groups of DASH segments 308 that can generate a delay when initially tuning to a particular channel or switching between channels.

Another difficulty is the potential for lost FDT instances. Each FDT instance is self-contained and may include the URL for the corresponding DASH segments 308 needed to play the video from the local cache. If the FDT instance is lost, the system may not have the information needed to display the corresponding DASH segments 308.

Figure 4:
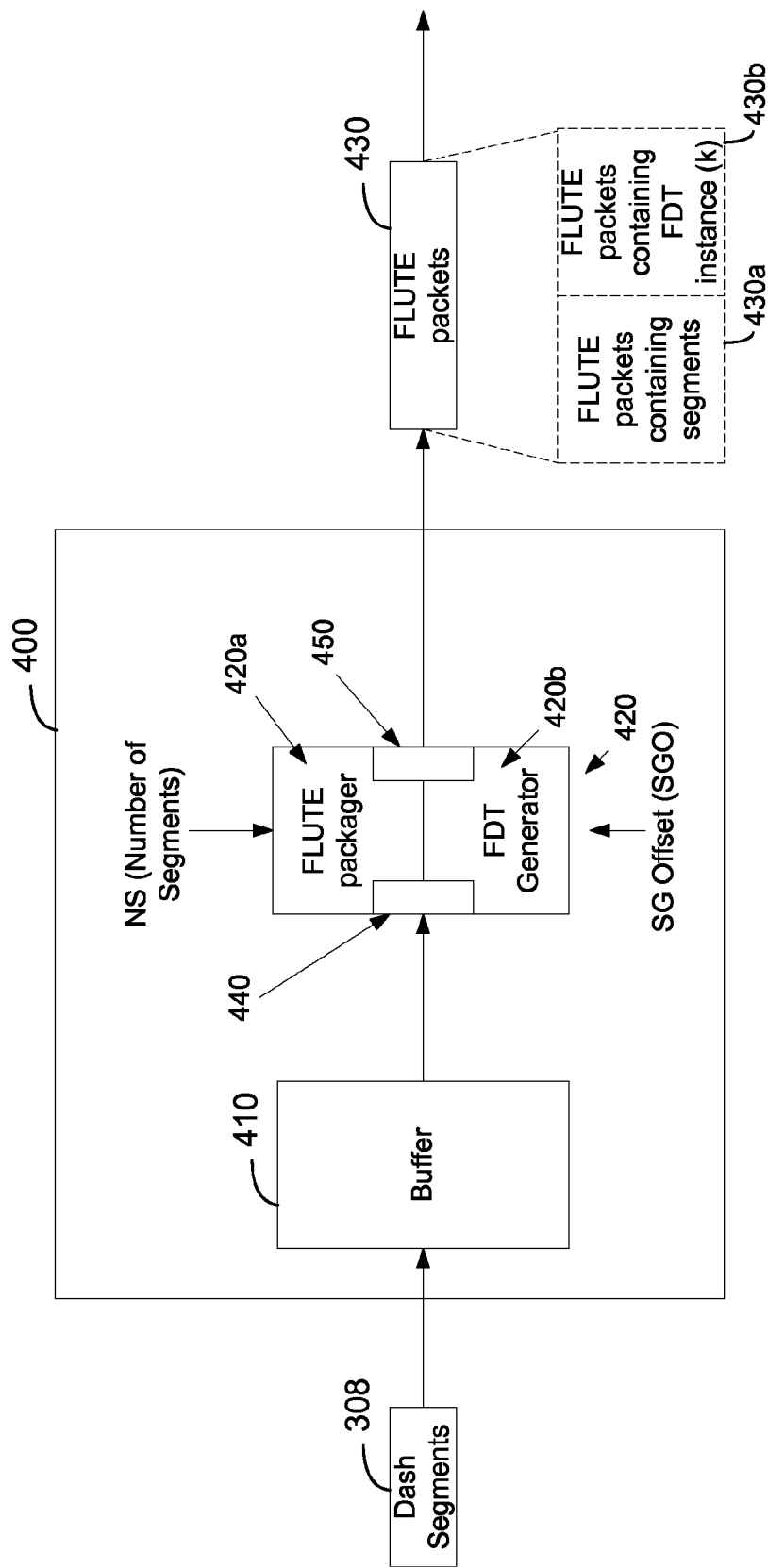
FIG. 4 is a block diagram of a FLUTE packing engine according to one aspect of the present disclosure.

Referring now to FIG. 4, an embodiment of a FLUTE packaging engine (FPE) 400 is shown. FPE 400 and the FLUTE packets 430 emerging therefrom (via communications port 450) may replace FPE 310 and FLUTE packets 312, respectively, in FIG. 3.

FPE 400 may include a buffer 410 that may receive the DASH segments 308 from the DASH encoder 306, and can hold some number, n, of such segments. Buffer 410 may be a FIFO buffer, and n may be greater than or equal to a minimum group size of DASH segments 308 that FPE 400 may aggregate. For example, if FPE 400 is configured to aggregate a maximum of three (3) DASH segments 308, then buffer 410 may have a size n that is greater than or equal to three (3). The buffer 410 size of three (3) or more enables the buffer 410 to store three (3) or more DASH segments to be processed by the FPE 400.

Buffer 410 may be accessed by a generator 420 via a communications port 440. Generator 420 may have two cooperating sections, a FLUTE packager 420a and an FDT generator 420b, and be responsible for two related operations: (1) FLUTE packager 420a may include functions for packaging DASH segments 308 into FLUTE packets containing segments 430a, and (2) FDT generator 420b may include functions for generating the FLUTE packets containing FDT instance 430b, corresponding to FLUTE packets 430a. FLUTE packager 420a and an FDT generator 420b, in this context, may refer to independent hardware and/or software components, and may be a single integrated circuit (IC) that is running two related or independent software programs.

Generator 420 may also receive as data inputs: (1) a value NS that corresponds to the number of DASH segments 308 that FPE 400 may aggregate and (2) a segment group ("SG") offset (SGO), which represents an offset value for the segments. The value of NS may affect the initial delay before presentation starts. The SGO may be the offset between the beginning segment number of a previous SG and that of a current SG, and may affect the channel switching delay. The value NS that corresponds to the number of DASH segments 308 that the FPE 400 may aggregate may be configured to reduce the initial delay before presentation. The SGO may be configured to reduce the channel switching delay. The initial delay and channel switching delay may be related to the transmission scheduling period. For reasons discussed below, SGO may be less than NS.

Both NS and SGO may be preconfigured according to the system requirements. However, the disclosure is not so limited, and either value may be fixed and/or variable by automatic or manual manipulation.

Generator 420 may be implemented by software operating in conjunction with electronic computer hardware, such as via a preprogrammed integrated circuit (IC). However, other software, hardware and/or firmware configurations may be used. In addition, the generating and packaging operations may be performed in a single component, or dispersed (at the software and/or hardware level) amongst multiple components. The disclosure is not limited to any particular architecture for the generator 420.

Figure 5:
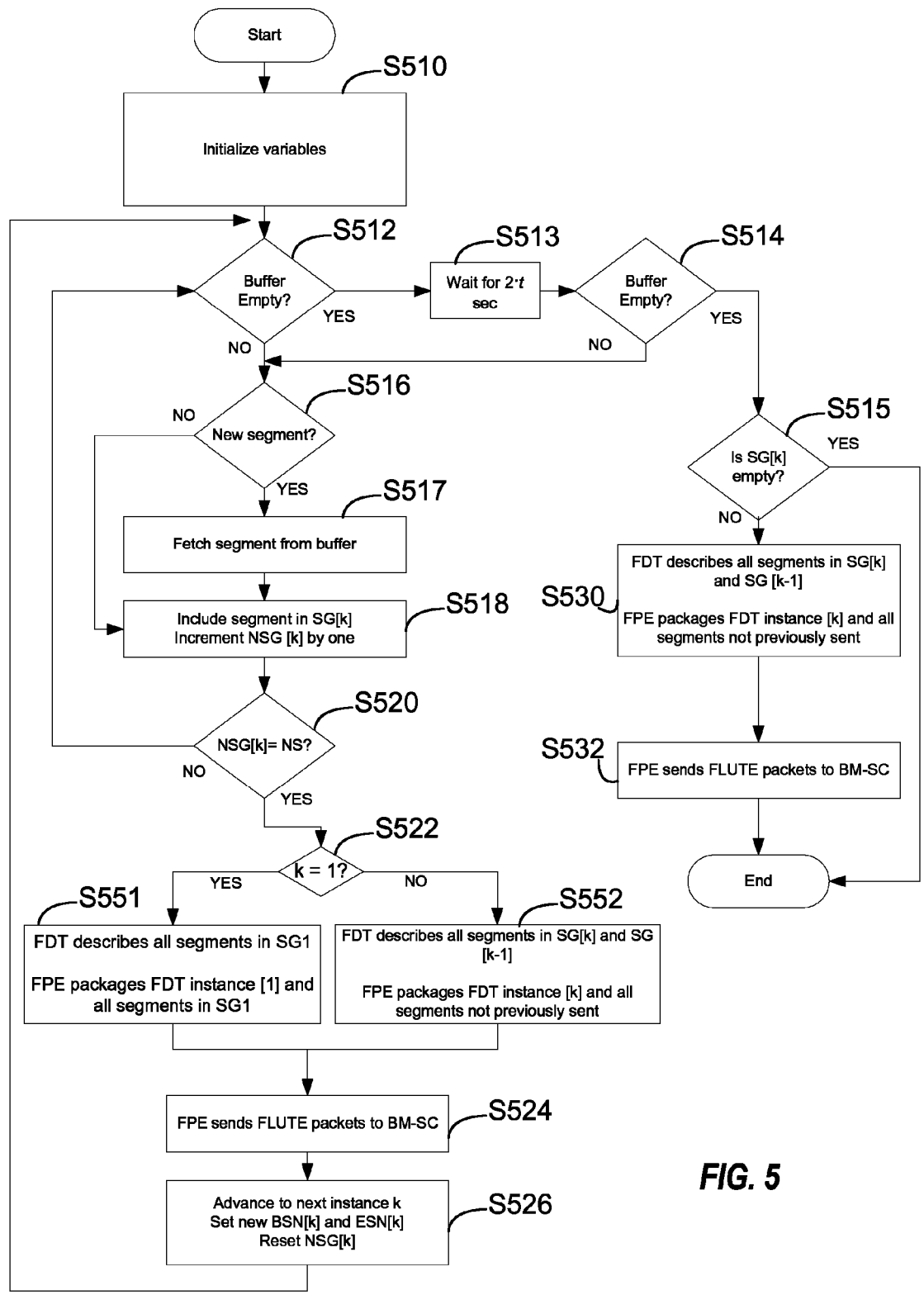
FIG. 5 is a flowchart of a methodology performed by the FLUTE packing engine of FIG. 4 according to one aspect of the present disclosure.
Figure 6A:
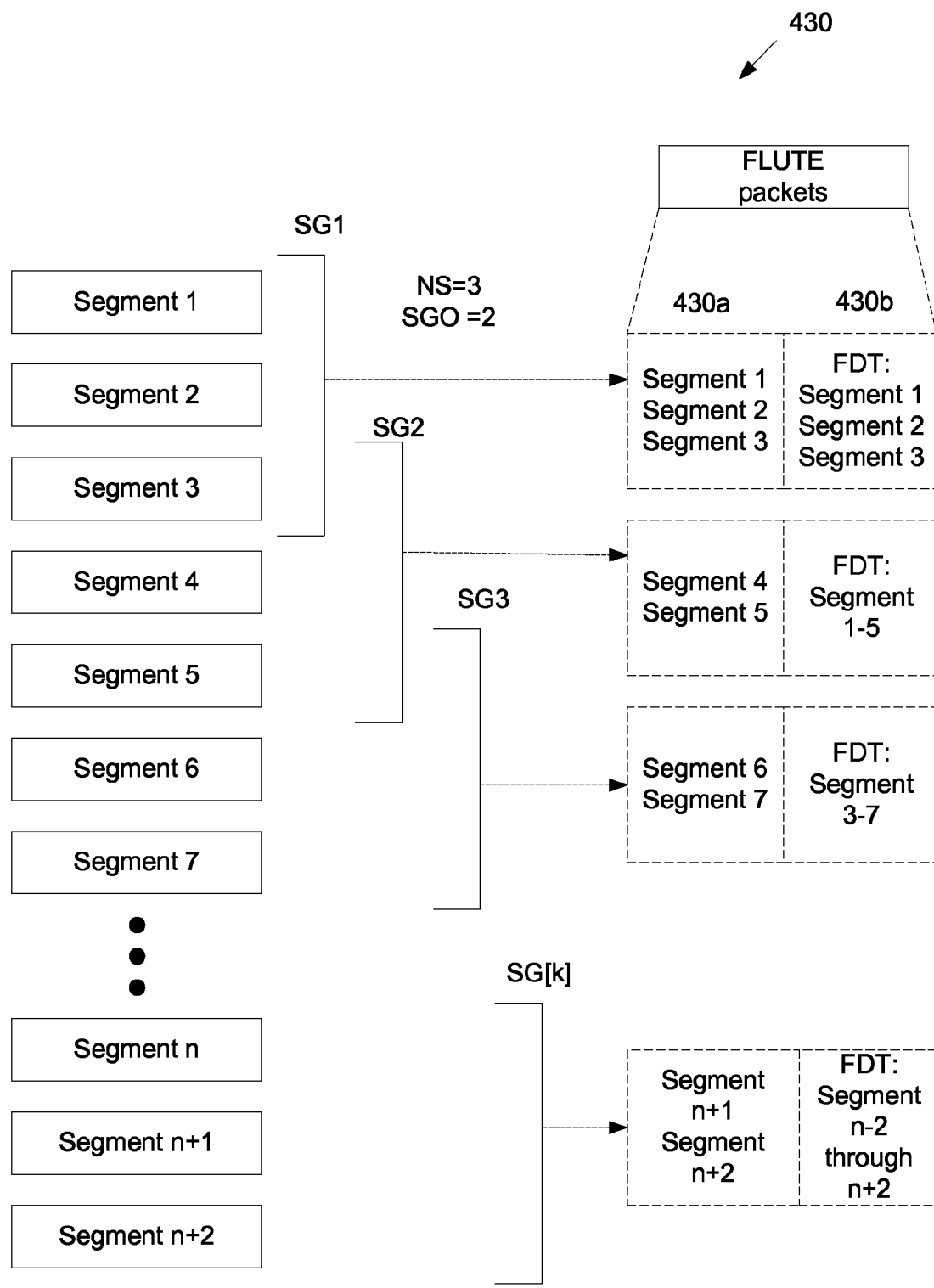
FIG. 6A is a block diagram of the grouping of DASH segments into segment groups per the methodology of FIG. 5 according to one aspect of the present disclosure.

Operations performed by an exemplary embodiment of generator 420 will be described with references to FIGS. 5 and 6A. FIG. 5 is a flowchart of the operation, and FIG. 6A shows conceptually how implementation of the flowchart may be applied to a series of DASH segments 308 for values of NS=3 and SGO=2. These values are exemplary only, and any appropriate values may be chosen.

Figure 8:
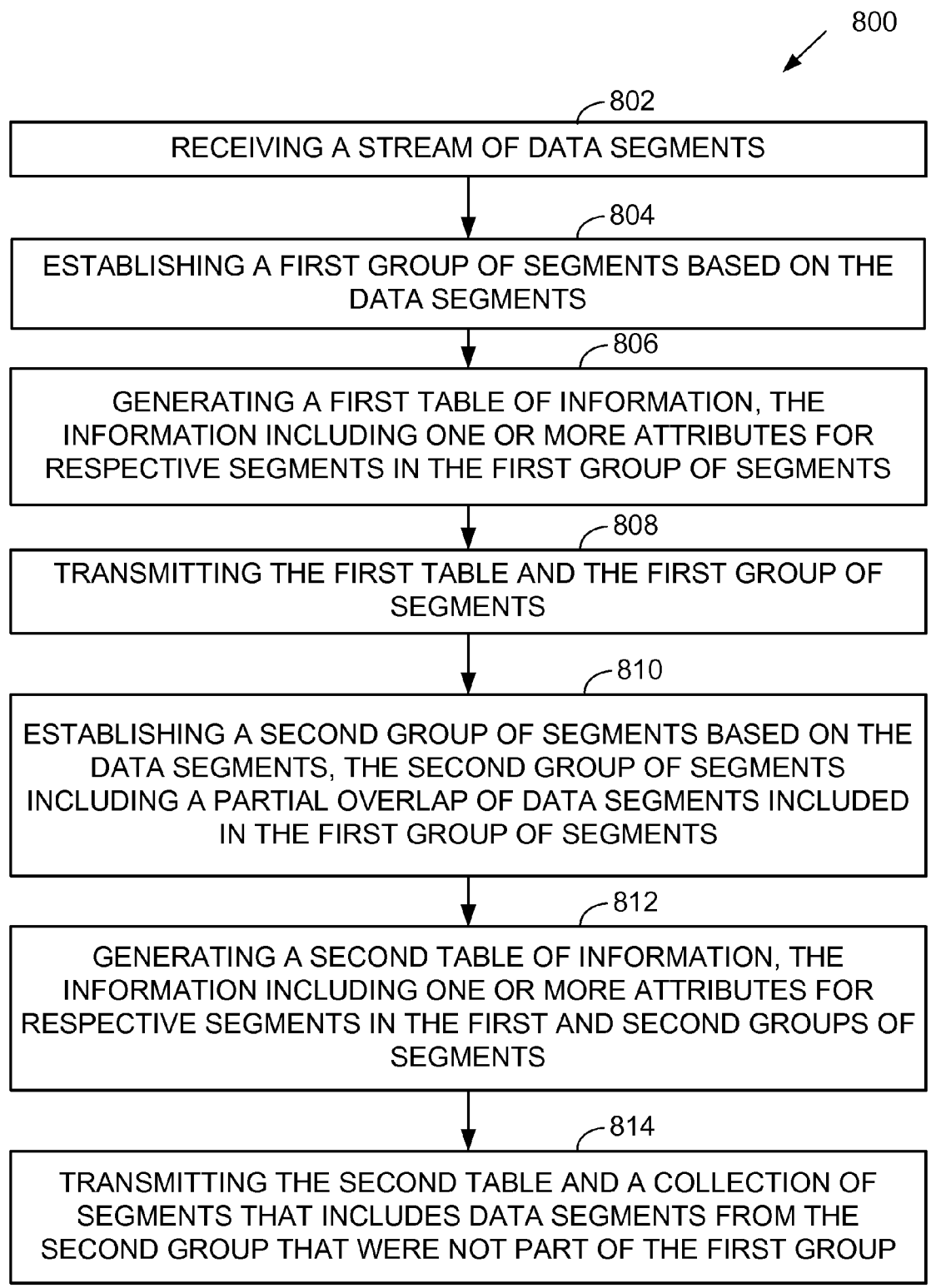
FIG. 8 shows an exemplary methodology for controlling streaming delay in accordance with one aspect of the present disclosure.
Figure 9:
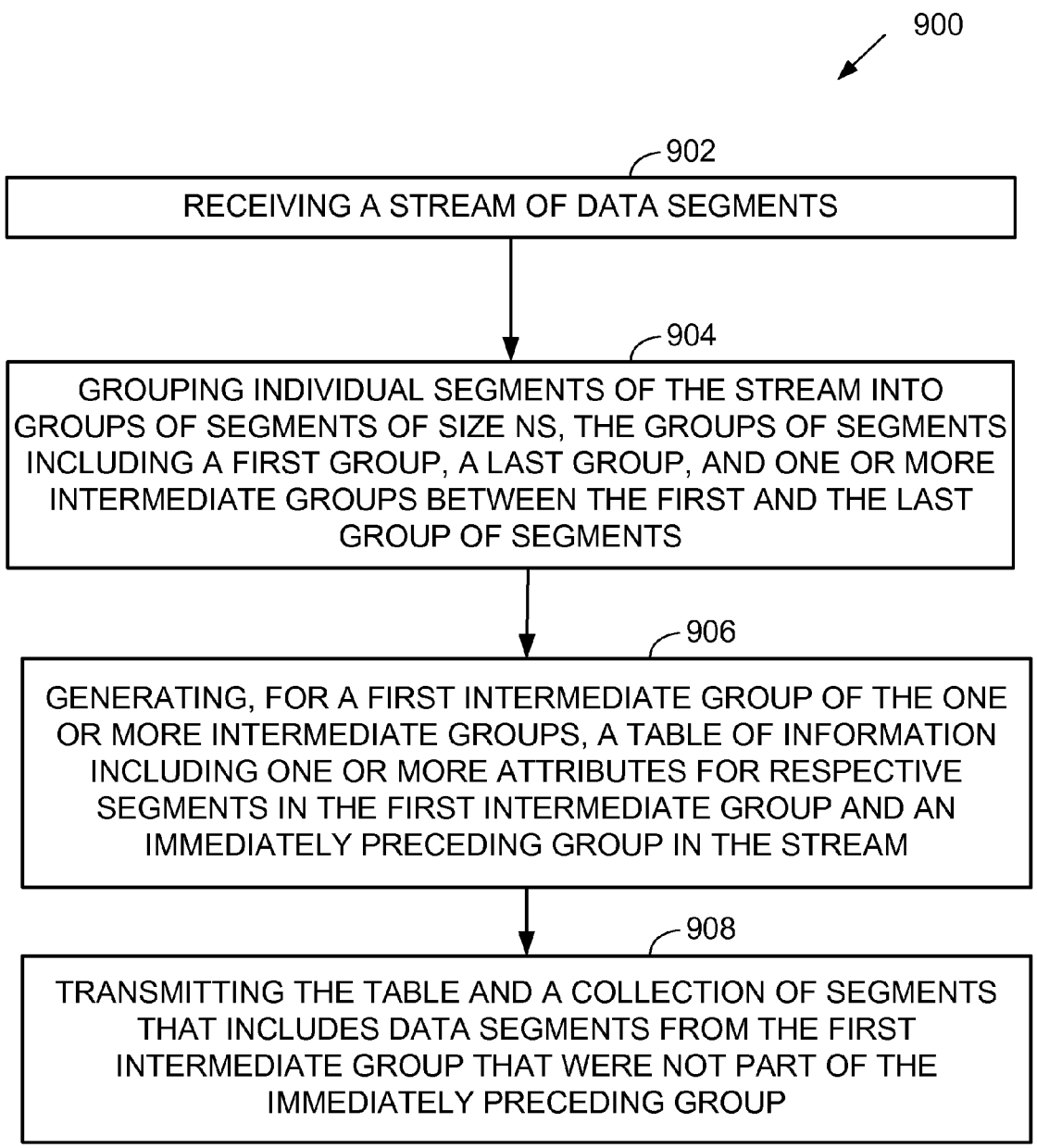
FIG. 9 shows another exemplary methodology controlling streaming delay in accordance with another aspect of the present disclosure.

It is to be understood that methodologies that may be implemented in accordance with the disclosed subject matter may be better appreciated with reference to flow charts, such as FIGS. 5, 8, and 9. For purposes of simplicity of explanation, methodologies may be shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

In the following discussion, the exemplary values are selected as three (3) DASH segments per group (i.e., NS=3) and a segment group offset of two (2) (i.e., SGO=2). For the first group of DASH segments, the instance number may be defined as one (1) (i.e., k=1). The instance number may increment until all DASH segments are grouped together. In the first group, the beginning segment number is one (1) (i.e., BSN[1]=1), and the ending segment number is three (3) (i.e., ESN[1]=3). The number of DASH segments processed and added to the first group may start at zero and increase to three (3) (i.e., NSG[1]=0 to 3). After three DASH segments are grouped together, the process proceeds to the second group of DASH segments.

For the second group of DASH segments, the instance number may be defined as two (2) (i.e., k=2). In the second group, the beginning segment number is three (3) (i.e., BSN[2]=3), and the ending segment number is five (5) (i.e., ESN[2]=5). It may be noted that the beginning segment number for the second group is three (3) and not four (4), even though the ending segment number from the first group was three (3). The beginning segment number does not follow from the ending segment number of the previous group because the beginning segment number is determined based on the SGO and the beginning segment number of the previous group. In this example, the SGO is selected as two (2). Therefore, the beginning segment number (three) for the second group is the beginning segment number (one) of the first group plus the SGO (two). The number of DASH segments processed and added to the second group may start at zero and increase to three (3) (i.e., NSG[2]=0 to 3). After three DASH segments are grouped together, the process proceeds to the next group of DASH segments.

The SGO may be beneficially used to satisfy a switching delay time requirement. Based on the switching delay time requirement, the SGO may be determined to satisfy the time requirement (i.e., delay is equal to or less than the time limit) The time requirement may be related to a channel switching delay. The SGO affects the channel switching delay because the SGO determines the offset of the beginning segments number of a previous SG and the beginning segments number of a current SG. The SGO may determine how many new segments may be added to each FLUTE package. The number of new segments may also affect the channel switching time delay a user perceives when tuning into an existing program, with the channel switching time delay being another time constraint that has to be satisfied. If two new segments are added and each segment has a 2 second duration, then the channel switching delay may be about 4 seconds (SGO*t+ MSP) and on average 2 seconds (SGO*t+MSP)/2.

Referring now to FIG. 5, the system may be initialized at S510. Four (4) variables may be established during initialization: (1) the instance variable k, (2) the beginning segment number BSN [k], (3) the ending segment number ESN [k], (4) and the counter for the number of segments in the group NSG [k].

At initialization, at S510, in an embodiment, k=1 for the first instance, BSN [1]=1 for the first DASH segment 308, ESN [1]=NS, and the number of segments in the first group NSG [1]=0. Further, all segment groups may be considered empty in this embodiment.

S512, S516, S517, S518, and S520 may collectively define a recursive operation in the methodology that may aggregate DASH segments 308 for packaging. At S512, the buffer 410 may be checked to see if it is empty. If not, at S516, a determination may be made as to whether the next DASH segment 308 is a new segment or a segment that has been previously retrieved from buffer 410. If the next DASH segment has been previously retrieved, then control may pass to S518. If the next DASH segment is a new segment, then at S517 the next DASH segment 308 may be retrieved from buffer 410; as discussed above, buffer 410 may be a FIFO buffer, such that the retrieved DASH segment 308 is simply the next segment in buffer storage, although other buffers and methods may be used. Control may then pass to S518.

At S518, the segment may be considered added to the segment group, and the counter NSG [k=1] may be incremented by one (1). At S520, control may determine whether the number of segments in the group equals NS. If not, then control may return to S512 to add more segments.

The above processes are reflected in FIG. 6A via the accumulation of segments into the first group SG [k=1] (i.e., SG1). As noted above, for the example in FIG. 6A, NS=3. As such, steps S512, S516, S517, S518, and S520 may loop three times to add three segments, segments 1-3, to SG [k=1].

Referring back to FIG. 5, at S522, different actions may be taken based upon whether or not it is the first instance (k=1) or a later instance. If it is the first instance (which is the current state in the corresponding discussion of FIG. 6A), then at S524, generator 420 may (a) package all of the accumulated DASH segments 308 into FLUTE packets 430a and (b) generate a corresponding FDT instance 430b that may describe the FDT attributes for all of the segments within the corresponding FLUTE packet 430a. The FLUTE packet 430a and corresponding FDT instance 430b may then be sent from generator 420 via communications port 450 to BM-SC 314 at S524 for dispatch to the UE for display on a display device. In the example of FIG. 6A, segments 1-3 may be the contents of FLUTE packet 430a, and FDT information relating thereto may be found in the corresponding FDT instance 430b.

Control may then pass to S526, where the system may prepare for the next FDT instance. The instance counter k may be incremented by one (1). The beginning segment number BSN [k] for that new instance may be incremented by the value of the SGO (i.e., BSN [k]=BSN [k−1]+SGO). The ending segment number for that new instance may be set to the value of the beginning segment number+NS−1 (i.e., ESN [k]=BSN [k]+NS−1). The counter NSG may return to zero.

Control may then return to S512, where the system may begin to again accumulate DASH segments 308 into FLUTE packets for the next SG. However, because (a) the beginning segment number BSN was incremented by SGO rather than NS, and (b) SGO may be less than NS, the accumulated DASH segments 308 may include at least one DASH segment 308 that was already sent in prior FLUTE packets 430, plus at least one new DASH segment 308. This can be seen by referring back to FIG. 6A for the contents of the second instance SG2 for k=2. Since NS=3 and SGO=2 in the example of FIG. 6A, the segment group for SG2 may begin with and include segment 3, which was previously retrieved from buffer 410 and included in the already dispatched segment group SG1.

Processing may continue recursively via S512, S516, S517, S518, and S520 to associate the segment group with a total number of sequential DASH segments 308 to total NS. In FIG. 6A, with NS=3 and the first segment occupied by segment 3, two (2) more DASH segments 308 may generally need to be added to the segment group SG2, which may thus grow to include segment 4 and segment 5.

As can be seen from the above, incrementing the beginning segment count by SGO when SGO<NS may cause the FPE 400 to consider previously processed DASH segments 308. This contrasts with the example of FIG. 3 in which the segment count may have been advanced to the next segment in the sequence and may thus not have included consideration of a prior segment.

After the segment group is determined to be full at S520, control may pass to S522. When this is not the first instance (k≠1), the system, at S552, may generate an FDT instance 430b that may describe the FDT attributes for both the current SG[k] and the prior SG [k−1]. In the example of FIG. 6A, for the second instance k=2, SG1 included segments 1-3 and SG2 includes segments 3-5. The FDT instance [k=2] may thus describe the FDT attributes for segments 1-5. Note that the description for segment 3 may need to be included only once, as a duplicate of that description within the same FDT instance is not necessary. Thus, FDT[k] may describe SG[k]∪SG [k−1].

The system at S551 or S552 may also prepare the FLUTE packet 430a for the DASH segments 308 in SG[k]. Although the segment group SG[k] may have a total of NS DASH segments 308 assigned thereto, it is not necessary to resend a DASH segment 308 that was previously transmitted. In the example of FIG. 6A, for the second instance (k=2), SG2 may be assigned segments 3-5. However, since segment 3 was sent previously with SG1, it may not be necessary to resend segment 3, and thus segment 3 may be excluded from SG2. SG2 may thus only include segments 4 and 5. Generator 420 may thus prepare FLUTE package 430a with only those DASH segments 308 that were newly collected for the current segment group. This may be thought of as SG [k]−(SG [k]∩SG [k−1]). The FLUTE packet 430a may be sent per S524 for display at display 322.

The above processing may continue recursively through the entire content stream. With respect to the example of FIG. 6A, for the next instance k=3, FDT [k=3] instance 430b may describe the FDT attributes of segments 3-7, and the corresponding FLUTE packets 430a may include segments 6 and 7.

Eventually the entire content stream may end, such that there may no longer be any DASH segments 308 in buffer 410 to send. When the content stream ends, the buffer 410 may be empty, and the empty buffer status may be detected in S512. As each segment contains t seconds of encoded content, the time needed to process (e.g., at S516, S517, S518) each segment is unlikely to be longer than t seconds. Assuming a DASH segment may be generated every t seconds, waiting at least twice the segment time duration, or more generally n*t (n>1) seconds, may avoid a buffer underrun situation. After waiting n*t seconds, if the buffer is empty, the content stream has ended. As an example, the waiting period may be chosen to be 2·t seconds, but any time may be used as appropriate. The status of the buffer 410 may then be checked after the waiting period at S514; this may be done via a status flag associated with buffer 410, or other known methods for determining the status of a buffer, and the disclosure is not limited to any particular type of methodology by which the status of a buffer is checked.

If no segment has appeared by the end of the waiting period, the absence of a segment may indicate the end of the video stream. Control may pass to S515, which may check to see if there are any outstanding DASH segments 308 that were accumulated into the last group, waiting to be sent. If there are no outstanding DASH segments 308 that were accumulated into the last group (this may be the case if the last DASH segment 308 coincided with the last slot of the last segment group) then the process may end. If there are segments to be sent, then control may pass to steps S530 and S532, which parallel steps S522 and S524 discussed above. Once the last segments are sent at S532, the process may end.

Figure 6B:
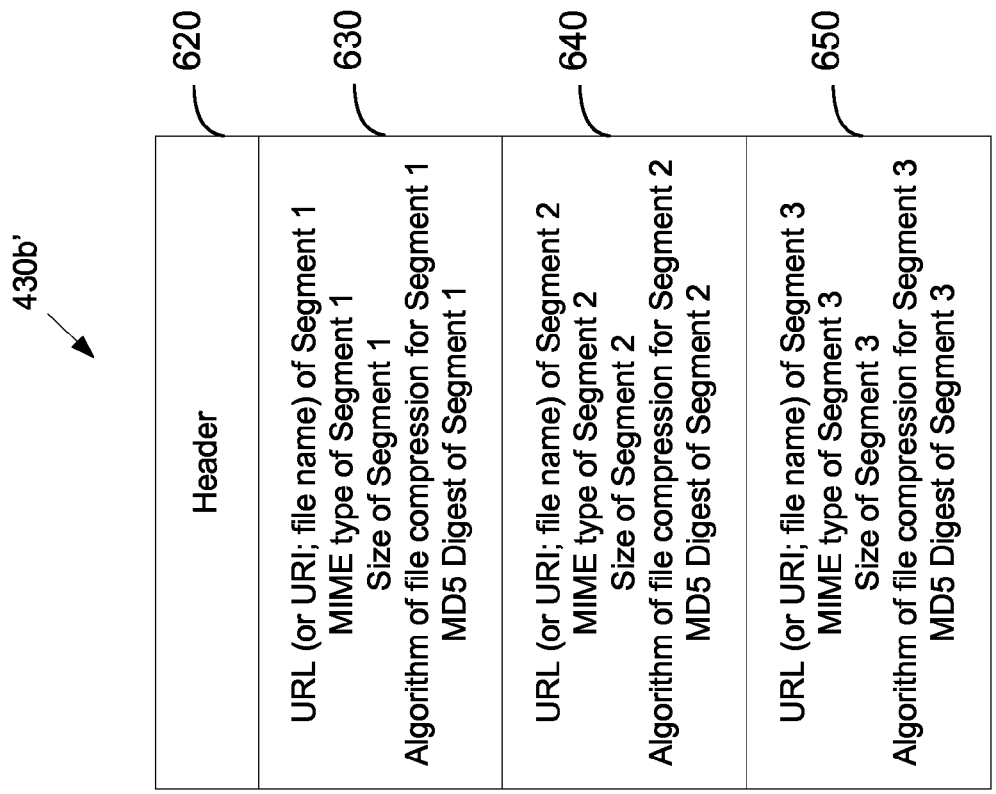
FIG. 6B illustrates an exemplary FDT instance according to the example of FIG. 6A.

FIG. 6B illustrates an exemplary FDT instance 430b' according to the example of FIG. 6A. The FDT provides a means to describe various attributes associated with files that are to be delivered. The FDT instance 430b' may include a header 620 and file attributes 630, 640, 650 for the associated files. Attributes may include a file name (specified by, e.g., a URL), file type (e.g., MIME media type of the file), size of the file, encoding format of the file, and/or the message digest of the file. In the example illustrated in FIG. 6A, the FDT instance 430b for SG1 includes segments 1-3. The FDT instance 430b' may correspond to the FDT instance 430b for SG1 of FIG. 6A. File attributes 630, 640, 650 are provided for segment 1, segment 2, and segment 3, respectively. The file attributes 630 for segment 1 may include the URL (or URI) of segment 1, MIME type of segment 1, file size of segment 1, algorithm of file compression of segment 1, and an MD5 digest of segment 1. The file attributes 640 for segment 2 may include the URL of segment 2, MIME type of segment 2, file size of segment 2, algorithm of file compression of segment 2, and an MD5 digest of segment 2. The file attributes 650 for segment 3 may include the URL of segment 3, MIME type of segment 3, file size of segment 3, algorithm of file compression of segment 3, and an MD5 digest of segment 3. For video content, the MIME media type of the three segments may be the same.

The above embodiments may provide various advantages. For example, when an FDT instance carries URLs of all segments described by the FDT instance, loss of that instance during transmission may imply the loss of all the segments described by it. In various embodiments herein, FDT instances may contain information that is duplicative of other FDT instances; this may provide a level of redundancy that mitigates the consequences of the loss of a particular FDT instance.

Another advantage may be the reduction in the end-to-end delay. In FIG. 5, the delay caused by packaging and sending the FLUTE packages was the number of DASH segments 308 in the group and the duration of those packages (NS·t). Yet for the embodiments discussed in conjunction with FIGS. 4-6, the delay may be based on the SG offset value and the duration of those segments (SGO·t). If SGO<NS, the corresponding delay is shorter. In the example of FIG. 6A in which NS=3 and SGO=2, the delay may be based on 2·t instead of 3·t. This may improve the probability that FLUTE packets 430 may arrive at BM-SC 314 within the allotted window for transmission.

The above embodiments may provide various advantages to the end user who views the video content on display 322. As discussed above, loss of an FDT instance may result in an inability to access the underlying video content that the FDT instance describes, which could result in a gap in the video playback on the display 322. To the extent that FDT instances may contain information that is duplicative of other FDT instances, then the redundancy may decrease the likelihood of any interruption in the video playback at display 322.

Another potential advantage to the end user may be a reduction in the delay when initially tuning to a channel or switching a channel when SGO<NS. As discussed above, the initial delay of a user tuning into a channel using architecture consistent with, e.g., FIG. 3 may be in the range of 0 to NS*t+MSP, with an average delay of (NS*t+MSP)/2. Using methodology of various embodiments herein, e.g., FIGS. 4-6, the channel switching delay of a user tuning into an existing channel may be in the range of 0 to SGO*t+MSP, with an average delay of (SGO*t+MSP)/2.

Figure 7:
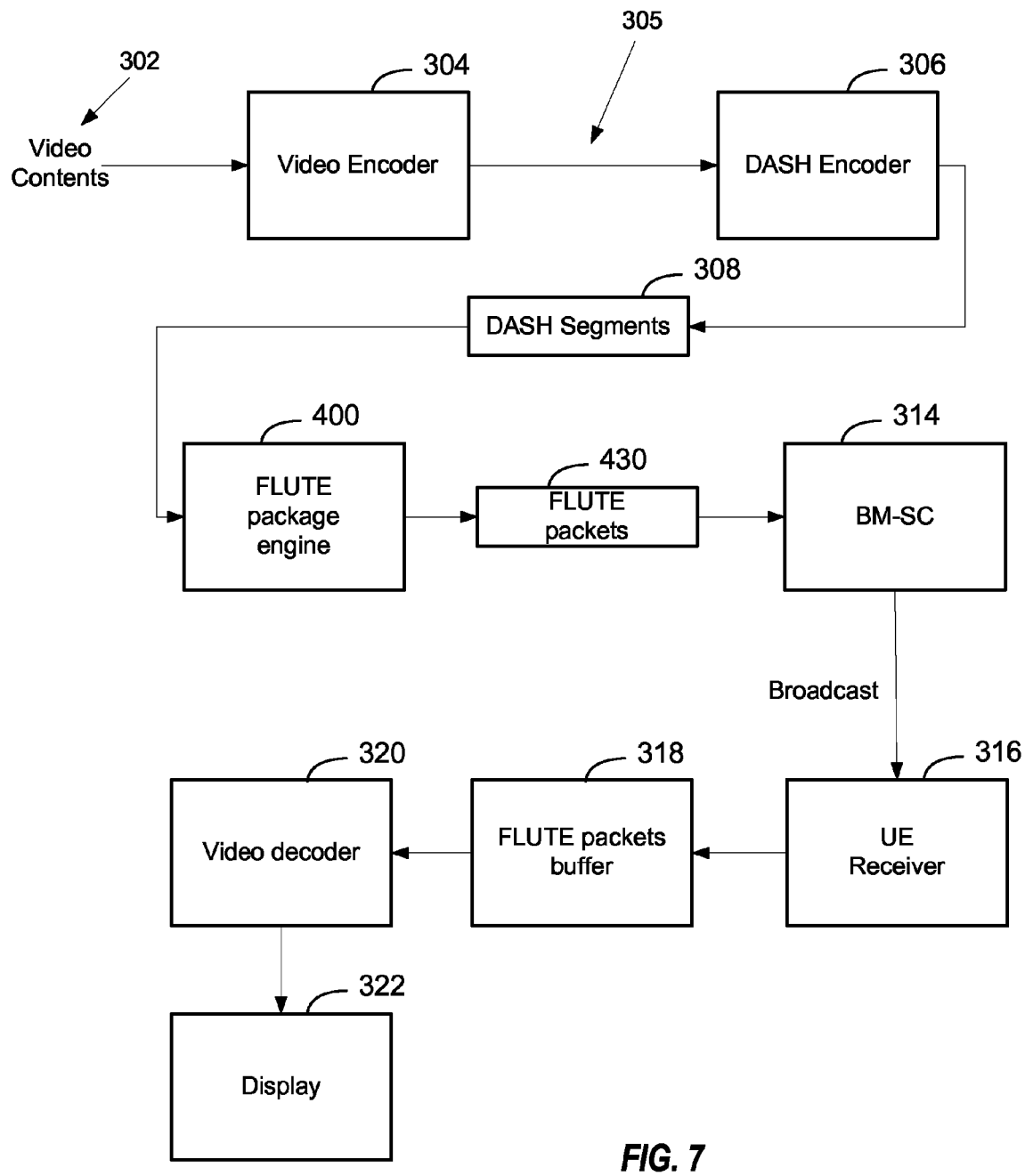
FIG. 7 is a block diagram conceptually illustrating DASH over FLUTE in eMBMS utilizing the FLUTE packaging engine of FIG. 4.

As noted above, FPE 400 and the FLUTE packets 430 emerging therefrom may replace FPE 310 and FLUTE packets 312, respectively, in FIG. 3. This may be reflected in the embodiment illustrated in FIG. 7. The operation of the remaining components shown in FIG. 3 (and FIG. 7) may generally be the same when utilizing FPE 400, although as discussed above the FLUTE packets 430 in FIG. 7 may include different information from the FLUTE packets in the embodiment of FIG. 3.

FIG. 8 shows an exemplary methodology for controlling streaming delay that may be performed by, for example, the generator 420. The method 800 may include, at 802, receiving a stream of data segments. The method may include, at 804, establishing a first group of segments based on the data segments. The method may include, at 806, generating a first table of information, the information including one or more attributes for respective segments in the first group of segments. The method may include, at 808, transmitting the first table and the first group of segments. The method may include, at 810, establishing a second group of segments based on the data segments, the second group of segments including a partial overlap of data segments included in the first group of segments. The method may include, at 812, generating a second table of information, the information including one or more attributes for respective segments in the first and second groups of segments. The method may include, at 814 transmitting the second table and a collection of segments that includes data segments from the second group that were not part of the first group.

FIG. 9 shows another exemplary methodology for controlling streaming delay that may be performed by, for example, the generator 420. The method 900 may include, at 902, receiving a stream of data segments. The method may include, at 904, grouping individual segments of the stream into groups of segments of size NS, the groups of segments including a first group, a last group, and one or more intermediate groups between the first and the last group of segments. The method may include, at 906, generating, for a first intermediate group of the one or more intermediate groups, a table of information including one or more attributes for respective segments in the first intermediate group and an immediately preceding group in the stream. The method may include, at 908, transmitting the table and a collection of segments that includes data segments from the first intermediate group that were not part of the immediately preceding group.

Figure 10:
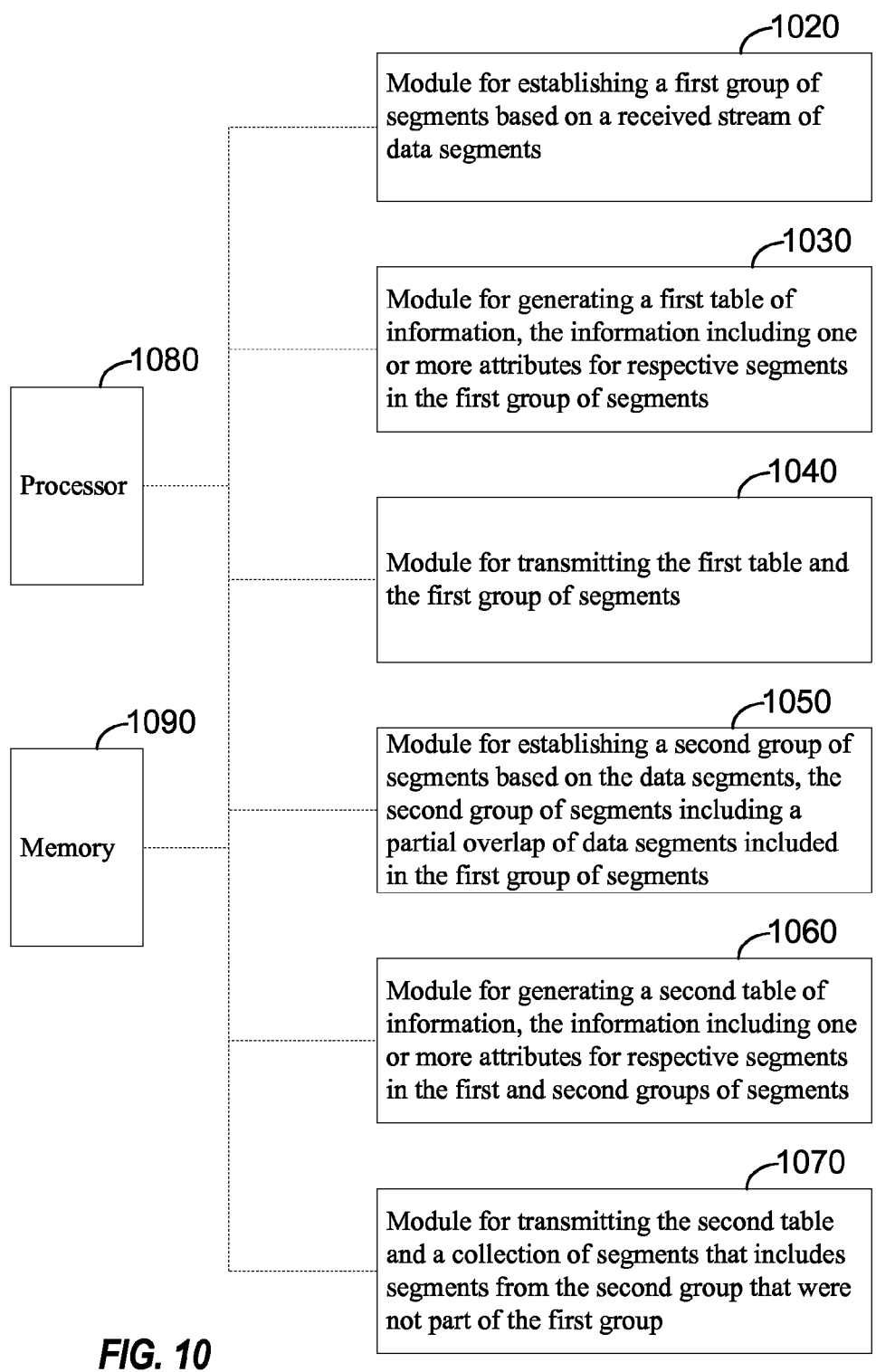
FIG. 10 is a block diagram of another exemplary embodiment of one aspect of the present disclosure, for example, in accordance with the methodology of FIG. 8.

Referring now to FIG. 10, another exemplary embodiment of the present disclosure is shown at apparatus 1000. The apparatus 1000 may implement the methodology of FIG. 8. The apparatus 1000 may include a module 1020 for establishing a first group of segments based on a received stream of data segments. A non-limiting example of such a module 1020 may be generator 420. As discussed above, generator 420 may receive DASH segments 308 and send them as segment groups SG [k] in FLUTE packets 430a. By way of non-limiting example, FIG. 6A illustrates an example in which FLUTE packager 420a may receive segments 1-3 and may assign segments 1-3 to SG1. As discussed above, this functionality of generator 420 may be hardware and/or software, and may include one or more processors and/or one or more memories.

The apparatus may include a module 1030 for generating a first table of information, the information including one or more attributes for respective segments in the first group of segments. A non-limiting example of such a module 1020 may be generator 420. As discussed above, FDT generator 420b may prepare an FDT instance [k] 230b that describes DASH segments 308 that are assigned to segment groups SG [k]. By way of non-limiting example, FIG. 6A illustrates how generator 420 may receive segments 1-3, may ultimately assign segments 1-3 to SG1, and may prepare an instance FDT [1] that describes attributes of segments 1-3. As discussed above, this functionality of generator 420 may be hardware and/or software, and may include one or more processors and/or one or more memories.

The apparatus may include a module 1040 for transmitting the first table and the first group of segments. A non-limiting example of module 1040 may be or may include the data output of FPE 400 and/or other components shown and discussed above.

The apparatus may include a module 1050 for establishing a second group of segments based on the data segments, the second group of segments including a partial overlap of data segments included in the first group of segments. A non-limiting example of such a module 1020 may be generator 420. As discussed above, generator 420 may prepare an FDT instance [k] 430b that describes DASH segments 308 that are assigned to segment groups SG [k]. By way of non-limiting example, FIG. 6A illustrates how generator 420 may receive segments 1-5, and may ultimately assign segments 1-3 to SG1 and segments 3-5 to SG2. As discussed above, this functionality of generator 420 may be hardware and/or software, and may include one or more processors and/or one or more memories.

The apparatus may include a module 1060 for generating a second table of information, the information including one or more attributes for respective segments in the first and second groups of segments. A non-limiting example of such a module 1060 may be generator 420. As discussed above, generator 420 may receive DASH segments 308 and send them as segment groups SG [k] as FLUTE packets 430a, e.g., as SG1 and SG2 described with respect to FIG. 6A. Generator 420 may also generate FDT instances [k] 430(b), which may describe attributes of SG[k]∪SG [k−1]. By way of non-limiting example, FIG. 6A illustrates how generator 420 may receive segments 1-5, and may generate a corresponding FDT instance that describes segments 1-5. As discussed above, this functionality of generator 420 may be hardware and/or software, and may include one or more processors and/or one or more memories.

The apparatus may include a module 1070 for transmitting the second table and a collection of segments that includes segments from the second group that were not part of the first group. A non-limiting example of module 1070 may be or may include the connection port 450 of FPE 400 and/or other components shown and discussed above. The apparatus may include a processor 1080 and/or a memory 1090 that connect to the modules, and/or may provide the functionality of any of the modules.

The components 1020-1070 may include a means for establishing a first group of segments based on a received stream of data segments. For example, the means for establishing the first group may be configured to determine time constraints related to receiving the stream of data segments and transmitting tables of information for the data segments. For example, the means for establishing the first group may be configured to determine a number of data segments for the first group based on the time constraints. The components 1020-1070 may include a means for generating a first table of information, the information including one or more attributes for respective segments in the first group of segments, a means for transmitting the first table and the first group of segments, a means for establishing a second group of segments based on the data segments, the second group of segments including a partial overlap of data segments included in the first group of segments. For example, the means for establishing the second group may be configured to determine time constraints related to receiving the stream of data segments and transmitting tables of information for the data segments. For example, the means for establishing the second group may be configured to determine a number of data segments for the second group based on the time constraints. The components 1020-1070 may include a means for generating a second table of information, the information including one or more attributes for respective segments in the first and second groups of segments, and a means for transmitting the second table and a collection of segments that includes segments from the second group that were not part of the first group. The means may or may not include at least one control processor (e.g., the processor 1080 of FIG. 10) operating an algorithm. The algorithm may include establishing a first group of segments based on a received stream of data segments. The algorithm may include generating a first table of information, the information including one or more attributes for respective segments in the first group of segments. The algorithm may include transmitting the first table and the first group of segments. The algorithm may include establishing a second group of segments based on the data segments, the second group of segments including a partial overlap of data segments included in the first group of segments. The algorithm may include generating a second table of information, the information including one or more attributes for respective segments in the first and second groups of segments. The algorithm may include transmitting the second table and a collection of segments that includes segments from the second group that were not part of the first group.

Figure 11:
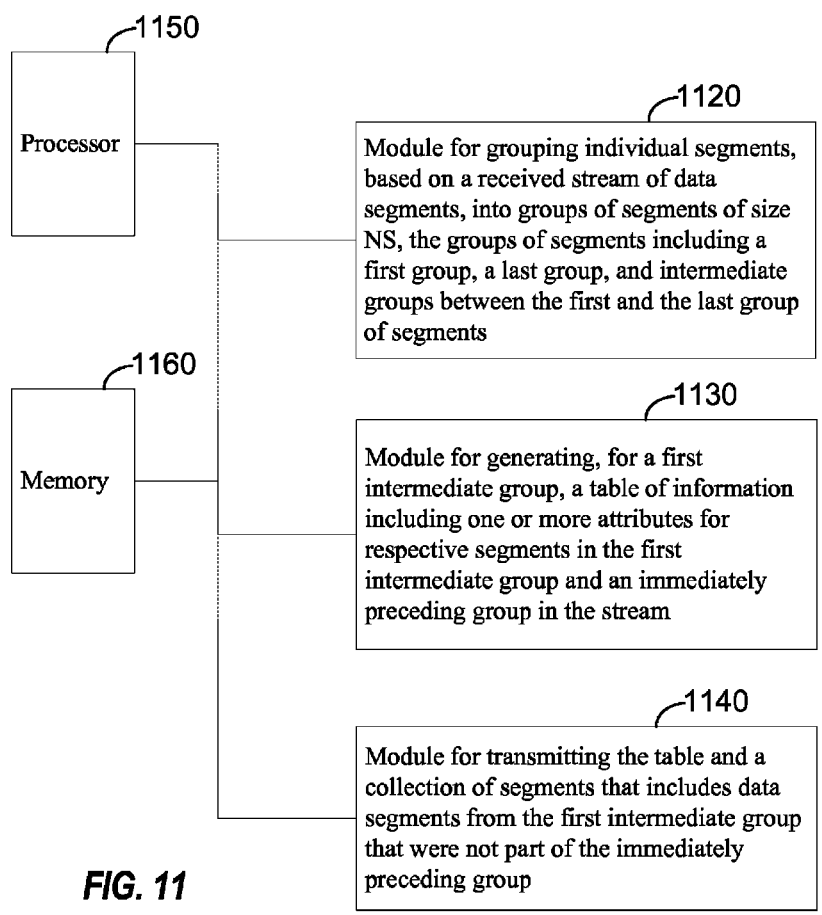
FIG. 11 is a block diagram of another exemplary embodiment of one aspect of the present disclosure, for example, in accordance with the methodology of FIG. 9.

Referring now to FIG. 11, another exemplary embodiment of the present disclosure is shown at apparatus 1100. The apparatus 1100 may implement the methodology of FIG. 9. The apparatus may include a module 1120 for grouping individual segments, based on a received stream of data segments, into groups of segments of size NS, the groups of segments including a first group, a last group, and one or more intermediate groups between the first and the last group of segments. A non-limiting example of such a module 1120 may be generator 420. As discussed above, generator 420 may receive DASH segments 308 and send them as segment groups SG [k] as FLUTE packets 430a. As discussed above, this functionality of generator 420 may be hardware and/or software, and may include one or more processors and/or one or more memories.

The apparatus 1100 may include a module 1130 for generating, for a first intermediate group, a table of information including one or more attributes for respective segments in the first intermediate group and an immediately preceding group in the stream. A non-limiting example of such a module 1130 may be generator 420. As discussed above, generator 420 may receive DASH segments 308 and send them as segment groups SG [k] as FLUTE packets 430a. Generator 420 may also generate FDT instances [k] 430(b), which may describe attributes of SG[k]∪SG [k−1]. As discussed above, this functionality of generator 420 may be hardware and/or software, and may include one or more processors and/or one or more memories.

The apparatus 1100 may include a module 1140 for transmitting the table and a collection of segments that includes data segments from the first intermediate group that were not part of the immediately preceding group. A non-limiting example of module 1140 may be or may include the connection port 450 of output of FPE 400 and/or other components shown and discussed above. The apparatus 1100 may include a processor 1150 and/or a memory 1160 that connect to the modules, and/or may provide the functionality of any of the modules.

The components 1120-1140 may include a means for grouping individual segments, based on a received stream of data segments, into groups of segments of size NS, the groups of segments including a first group, a last group, and intermediate groups between the first and the last group of segments. For example, the means for grouping individual segments may be configured to determine time constraints related to grouping the individual segments. For example, the means for grouping individual segments may be configured to determine the NS based on the time constraints. The components 1120-1140 may include a means for generating, for a first intermediate group, a table of information including one or more attributes for respective segments in the first intermediate group and an immediately preceding group in the stream, and a means for transmitting the table and a collection of segments that includes data segments from the first intermediate group that were not part of the immediately preceding group. The means may or may not include at least one control processor (e.g., the processor 1150 of FIG. 11) operating an algorithm. The algorithm may include grouping individual segments, based on a received stream of data segments, into groups of segments of size NS, the groups of segments including a first group, a last group, and intermediate groups between the first and the last group of segments. The algorithm may include generating, for a first intermediate group, a table of information including one or more attributes for respective segments in the first intermediate group and an immediately preceding group in the stream. The algorithm may include transmitting the table and a collection of segments that includes data segments from the first intermediate group that were not part of the immediately preceding group.

While the above embodiments are described with respect to DASH on FLUTE over eMBMS, the invention is not so limited. Any appropriate protocols, architecture and/or network could be used. Also, while the application is described with respect an environment that utilizes multicast, any of unicast, multicast and/or broadcast may be used.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure may be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for sending data segments, comprising:
   receiving a single stream of data segments;
   establishing a first group of segments based on the data segments in the single stream;
   generating a first table of information, the information including one or more attributes for respective segments in the first group of segments;
   transmitting, on a multicast transmission, the first table and the first group of segments;
   establishing a second group of segments based on the data segments in the single stream, the second group of segments including a partial overlap of data segments included in the first group of segments;
   generating a second table of information, the information including one or more attributes for respective segments in the first and second groups of segments; and
   transmitting, on the multicast transmission, the second table and a collection of segments that includes data segments from the second group that were not part of the first group.

2. The method of claim 1, further comprising:
   determining one time constraint between receiving one group of data segments in the single stream of data segments and transmitting the first table, wherein the establishing the first group of segments is further based on the determined time constraint; and
   determining another time constraint between receiving another group of data segments in the single stream of data segments and transmitting the second table, wherein the establishing the second group of segments is further based on the another time constraint.

3. The method of claim 2, wherein:
   the establishing the first group of segments further comprises determining a number of data segments for the first group; and
   the establishing the second group of segments further comprises determining a number of data segments for the second group.

4. The method of claim 1, wherein the data segments are DASH segments.

5. The method of claim 1, wherein the first table and the first group of segments are FLUTE packets.

6. The method of claim 1, wherein the single stream of data segments comprises video data.

7. The method of claim 6, wherein the video data is encoded in one of MPEG2, MPEG4, H.264, or H.265.

8. The method of claim 1, wherein an attribute of the one or more attributes is a URL.

9. The method of claim 1, further comprising:
   establishing a third group of segments based on the data segments in the single stream, the third group of segments including a partial overlap of data segments included in the second group of segments;
   generating a third table of information, the information including one or more attributes for respective segments in the second and third groups of segments; and
   transmitting the second table and a collection of segments that includes segments from the third group of segments that were not part of the first or second group of segments.

10. A method for sending data segments, comprising:
    receiving a single stream of data segments;
    grouping individual data segments of the single stream into groups of segments of size NS, the groups of segments including a first group, a last group, and one or more intermediate groups between the first and the last group of segments;
    generating, for a first intermediate group of the one or more intermediate groups, a table of information including one or more attributes for respective segments in the first intermediate group and an immediately preceding group in the single stream; and
    transmitting, on a multicast transmission, the table and a collection of segments that includes data segments from the first intermediate group that were not part of the immediately preceding group.

11. The method of claim 10, wherein the data segments are DASH segments.

12. The method of claim 10, wherein the first table and the collection of segments are FLUTE packets.

13. The method of claim 10, wherein the single stream of data segments comprises video data.

14. The method of claim 10, wherein an attribute of the one or more attributes is a URL.

15. A system for sending data segments, comprising:
    means for establishing a first group of segments based on a received single stream of data segments;
    means for generating a first table of information, the information including one or more attributes for respective segments in the first group of segments;
    means for transmitting, on a multicast transmission, the first table and the first group of segments;
    means for establishing a second group of segments based on the data segments in the single stream, the second group of segments including a partial overlap of data segments included in the first group of segments;
    means for generating a second table of information, the information including one or more attributes for respective segments in the first and second groups of segments; and
    means for transmitting, on the multicast transmission, the second table and a collection of segments that includes data segments from the second group that were not part of the first group.

16. The system of claim 15, further comprising:
    means for determining one time constraint between receiving one group of data segments in the single stream of data segments and transmitting the first table, wherein the establishing the first group of segments is further based on the determined time constraint; and
    means for determining another time constraint between receiving another group of data segments in the single stream of data segments and transmitting the second table, wherein the establishing the second group of segments is further based on the another time constraint.

17. The system of claim 16, wherein:
the establishing the first group of segments further comprises determining a number of data segments for the first group; and
the establishing the second group of segments further comprises determining a number of data segments for the second group.

18. A system for sending data segments, comprising:
means for grouping individual segments, based on a received single stream of data segments, into groups of segments of size NS, the groups of segments including a first group, a last group, and intermediate groups between the first and the last group of segments;
means for generating, for a first intermediate group, a table of information including one or more attributes for respective segments in the first intermediate group and an immediately preceding group in the single stream; and
means for transmitting, on a multicast transmission, the table and a collection of segments that includes data segments from the first intermediate group that were not part of the immediately preceding group.

19. A system for sending data segments, comprising:
at least one processor configured to:
receive a single stream of data segments;
establish a first group of segments based on the single stream of data segments;
generate a first table of information, the information including one or more attributes for respective segments in the first group of segments;
transmit, on a multicast transmission, the first table and the first group of segments;
establish a second group of segments based on the single stream of data segments, the second group of segments including a partial overlap of data segments included in the first group of segments;
generate a second table of information, the information including one or more attributes for respective segments in the first and second groups of segments; and
transmit, on the multicast transmission, the second table and a collection of segments that includes data segments from the second group that were not part of the first group; and
a memory coupled to the at least one processor for storing data.

20. The system of claim 19, wherein the at least one processor is further configured to:
determine one time constraint between receiving one group of data segments in the single stream of data segments and transmitting the first table, wherein to establish the first group of segments is further based on the determined time constraint; and
determine another time constraint between receiving another group of data segments in the single stream of data segments and transmitting the second table, wherein to establish the second group of segments is further based on the another time constraint.

21. The system of claim 20, wherein:
to establish the first group of segments further comprises to determine a number of data segments for the first group; and
to establish the second group of segments further comprises to determine a number of data segments for the second group.

22. The system of claim 19, wherein the data segments are DASH segments.

23. The system of claim 19, wherein the first table and the first group of segments are FLUTE packets.

24. The system of claim 19, wherein the single stream of data segments comprises video data.

25. The system of claim 19, wherein an attribute of the one or more attributes is a URL.

26. The system of claim 19, wherein the at least one processor is further configured to:
establish a third group of segments based on the data segments, the third group of segments including a partial overlap of data segments included in the second group of segments;
generate a third table of information, the information including one or more attributes for respective segments in the second and third groups of segments; and
transmit the second table and a collection of segments that includes segments from the third group of segments that were not part of the first or second group of segments.

27. A system for sending data segments, comprising:
at least one processor configured to:
receive a single stream of data segments;
group individual segments of the single stream into groups of segments of size NS, the groups of segments including a first group, a last group, and intermediate groups between the first and the last group of segments;
generate, for a first intermediate group, a table of information including one or more attributes for respective segments in the first intermediate group and an immediately preceding group in the single stream; and
transmit, on a multicast transmission, the table and a collection of segments that includes data segments from the first intermediate group that were not part of the immediately preceding group; and
a memory coupled to the at least one processor for storing data.

28. The system of claim 27, wherein the segments are DASH segments.

29. The system of claim 27, wherein the first table and the collection of segments are FLUTE packets.

30. The system of claim 27, wherein the single stream of data segments comprises video data.

31. The system of claim 27, wherein an attribute of the one or more attributes is a URL.

32. A non-transitory computer-readable medium for managing the transmission of data segments, comprising code for:
receiving a single stream of data segments;
establishing a first group of segments based on the data segments in the single stream;
generating a first table of information, the information including one or more attributes for respective segments in the first group of segments;
transmitting, on a multicast transmission, the first table and the first group of segments;
establishing a second group of segments based on the data segments in the single stream, the second group of segments including a partial overlap of data segments included in the first group of segments;
generating a second table of information, the information including one or more attributes for respective segments in the first and second groups of segments; and
transmitting, on the multicast transmission, the second table and a collection of segments that includes data segments from the second group that were not part of the first group.

33. A non-transitory computer-readable medium of claim 32, further comprising code for:

determining one time constraint between receiving one group of data segments in the single stream of data segments and transmitting the first table, wherein the establishing the first group of segments is further based on the determined time constraint; and determining another time constraint between receiving another group of data segments in the single stream of data segments and transmitting the second table, wherein the establishing the second group of segments is further based on the another time constraint.

34. The non-transitory computer-readable medium of claim 33, wherein:

the establishing the first group of segments further comprises determining a number of data segments for the first group; and the establishing the second group of segments further comprises determining a number of data segments for the second group.

35. A non-transitory computer-readable medium for managing the transmission of data segments, comprising code for:

receiving a single stream of data segments;

grouping individual segments of the single stream into groups of segments of size NS, the groups of segments including a first group, a last group, and intermediate groups between the first and the last group of segments;

generating, for a first intermediate group, a table of information including one or more attributes for respective segments in the first intermediate group and an immediately preceding group in the single stream; and transmitting, on a multicast transmission, the table and a collection of segments that includes data segments from the first intermediate group that were not part of the immediately preceding group.

\* \* \* \* \*